(12) United States Patent
Park

(10) Patent No.: US 9,696,047 B2
(45) Date of Patent: Jul. 4, 2017

(54) AIR CONDITIONER AND METHOD FOR OPERATING AN AIR CONDITIONER

(71) Applicant: LG Electronics Inc., Seoul (KR)

(72) Inventor: Cheonsu Park, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 11 days.

(21) Appl. No.: 14/534,669

(22) Filed: Nov. 6, 2014

(65) Prior Publication Data

US 2015/0128618 A1 May 14, 2015

(30) Foreign Application Priority Data

Nov. 7, 2013 (KR) ........................ 10-2013-0134747

(51) Int. Cl.
  *G08C 19/16* (2006.01)
  *F24F 3/06* (2006.01)
  *F24F 11/00* (2006.01)
  *G05B 15/02* (2006.01)

(52) U.S. Cl.
  CPC ............ *F24F 3/065* (2013.01); *F24F 11/001* (2013.01); *F24F 11/0086* (2013.01); *G05B 15/02* (2013.01); *F24F 2011/0047* (2013.01); *F24F 2011/0067* (2013.01); *F24F 2011/0068* (2013.01)

(58) Field of Classification Search
  CPC ...... F24F 3/065; F24F 11/001; F24F 11/0086; F24F 2011/0067; F24F 2011/0047; F24F 2011/0068; G05B 15/02
  USPC ..................................................... 340/870.01
  See application file for complete search history.

(56) References Cited

U.S. PATENT DOCUMENTS

| 9,104,971 B1* | 8/2015 | Chamness ............... G06N 5/048 |
| 2008/0288716 A1* | 11/2008 | Arakawa ............ G06F 12/0246 |
| | | 711/103 |

(Continued)

FOREIGN PATENT DOCUMENTS

| CN | 102721143 A | 10/2012 |
| EP | 1 698 833 A2 | 9/2006 |

(Continued)

OTHER PUBLICATIONS

European Search Report issued in Application No. 14192151.0 dated Aug. 5, 2015.

*Primary Examiner* — Dhaval Patel
(74) *Attorney, Agent, or Firm* — Ked & Associates, LLP

(57) ABSTRACT

An air conditioner that stores data through communication between a plurality of air conditioner devices and a method for operating an air conditioner are provided. Data regarding power consumption quantities of a plurality of outdoor devices may be accumulatively stored in a state in which an additional data collecting device or an additional storage device is not connected to the plurality of outdoor devices, and the data regarding power consumption quantities of the outdoor devices may be transmitted to a device further connected to the plurality of outdoor devices. Consequently, it is possible to utilize data regarding power consumption of the air conditioner, set a target value based on the power consumption of the air conditioner, easily determine a power consumption pattern, and easily take measures to save energy.

15 Claims, 8 Drawing Sheets

(56) References Cited

U.S. PATENT DOCUMENTS

| | | | |
|---|---|---|---|
| 2011/0057044 A1* | 3/2011 | Nishino | F24F 11/0086 236/49.3 |
| 2011/0218681 A1* | 9/2011 | Jung | F24F 11/001 700/276 |
| 2014/0181297 A1* | 6/2014 | Nakatsugawa | H04L 43/0876 709/224 |
| 2015/0003814 A1* | 1/2015 | Miller | H04N 21/4583 386/297 |

FOREIGN PATENT DOCUMENTS

| | | |
|---|---|---|
| EP | 2 249 093 A1 | 11/2010 |
| EP | 2 343 485 A1 | 7/2011 |
| KR | 10-2013-0038559 A | 4/2013 |

\* cited by examiner

AIR CONDITIONER AND METHOD FOR OPERATING AN AIR CONDITIONER

CROSS-REFERENCE TO RELATED APPLICATION(S)

This application claims the priority benefit of Korean Patent Application No. 10-2013-0134747, filed in Korea on Nov. 7, 2013, the disclosure of which is incorporated herein by reference.

BACKGROUND

1. Field

An air conditioner and a method for operating an air conditioner are disclosed herein.

2. Background

An air conditioner is an apparatus that discharges cool air or hot air into a room to adjust a room temperature and to purify air in the room, thereby providing a more comfortable room environment for people. In general, the air conditioner may include an indoor unit or device, which may include a heat exchanger, installed in a room, and an outdoor unit or device, which may include a compressor and a heat exchanger, to supply refrigerant to the indoor unit.

The air conditioner may be controlled in a state in which the indoor unit including the heat exchanger, and the outdoor unit including the compressor and the heat exchanger are separated from each other. The air conditioner may be operated by controlling power supplied to the compressor or the heat exchanger. In addition, the air conditioner may include one outdoor unit or device and at least one indoor unit or device connected to the outdoor unit. The outdoor unit or device may supply refrigerant to the indoor unit according an operation state requested by a user, such that the air conditioner may be operated in a cooling mode or in a heating mode.

The air conditioner may perform a cooling operation or a heating operation according to a flow of refrigerant. The cooling operation of the air conditioner may be performed as follows. A high-temperature, high-pressure liquid refrigerant may be supplied to the indoor unit from the compressor of the outdoor unit via the heat exchanger of the outdoor unit. The refrigerant may be expanded by the heat exchanger of the outdoor unit with a result that the refrigerant is evaporated, and therefore, a temperature of surrounding air may be lowered. As an indoor unit fan may be rotated, cool air may be discharged into the room. On the other hand, the heating operation of the air conditioner may be performed as follows. A high-temperature, high-pressure gaseous refrigerant may be supplied to the indoor unit from the compressor of the outdoor unit. The high-temperature, high-pressure gaseous refrigerant may be liquefied by the heat exchanger of the indoor unit with a result that air is heated. As the indoor unit fan may be rotated, the heated air may be discharged into the room.

The air conditioner may be configured to have a structure in which data may be transmitted and received between air conditioner units. In general, the air conditioner may be configured such that the air conditioner units may transmit data to each other based on a predetermined cycle and receive from each other response signals corresponding to the transmitted data.

In general, the air conditioner may be configured such that a remote controller of the air conditioner may receive, store, and display data. In a case in which the air conditioner does not includes such a remote controller, however, it is necessary to provide a method for effectively storing data.

BRIEF DESCRIPTION OF THE DRAWINGS

Embodiments will be described in detail with reference to the following drawings in which like reference numerals refer to like elements, and wherein.

DETAILED DESCRIPTION

Advantages and features and a method of achieving the same will be more clearly understood from embodiments described below with reference to the accompanying drawings. However, embodiments are not limited to the following embodiments but may be implemented in various different forms. The embodiments are provided merely to complete disclosure and to fully provide a person having ordinary skill in the art to which the embodiments pertains with the category. The embodiments are defined only by the category of the claims. Wherever possible, the same reference numbers have been used throughout the specification to refer to the same or like elements.

Hereinafter, reference will now be made in detail to embodiments, examples of which are illustrated in the accompanying drawings.

Figure 1:
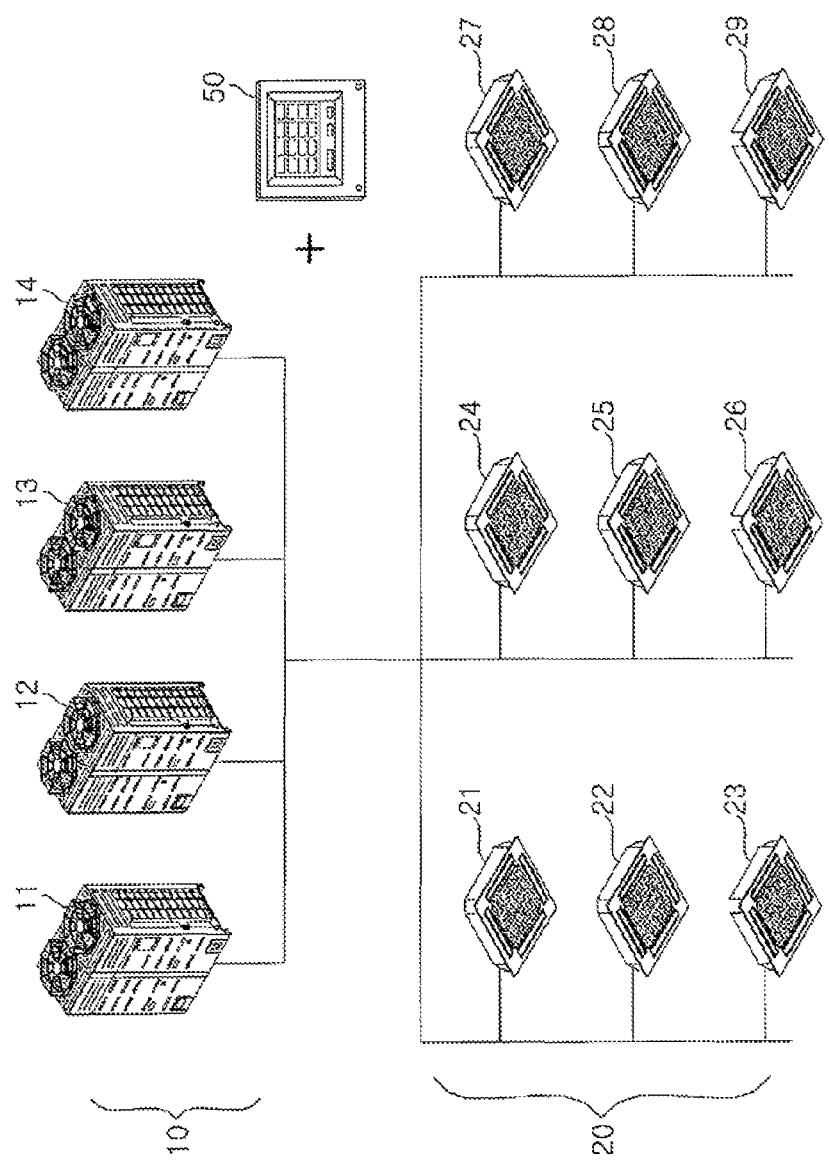
FIG. 1 is a schematic diagram of an air conditioner according to an embodiment.
Figure 2:
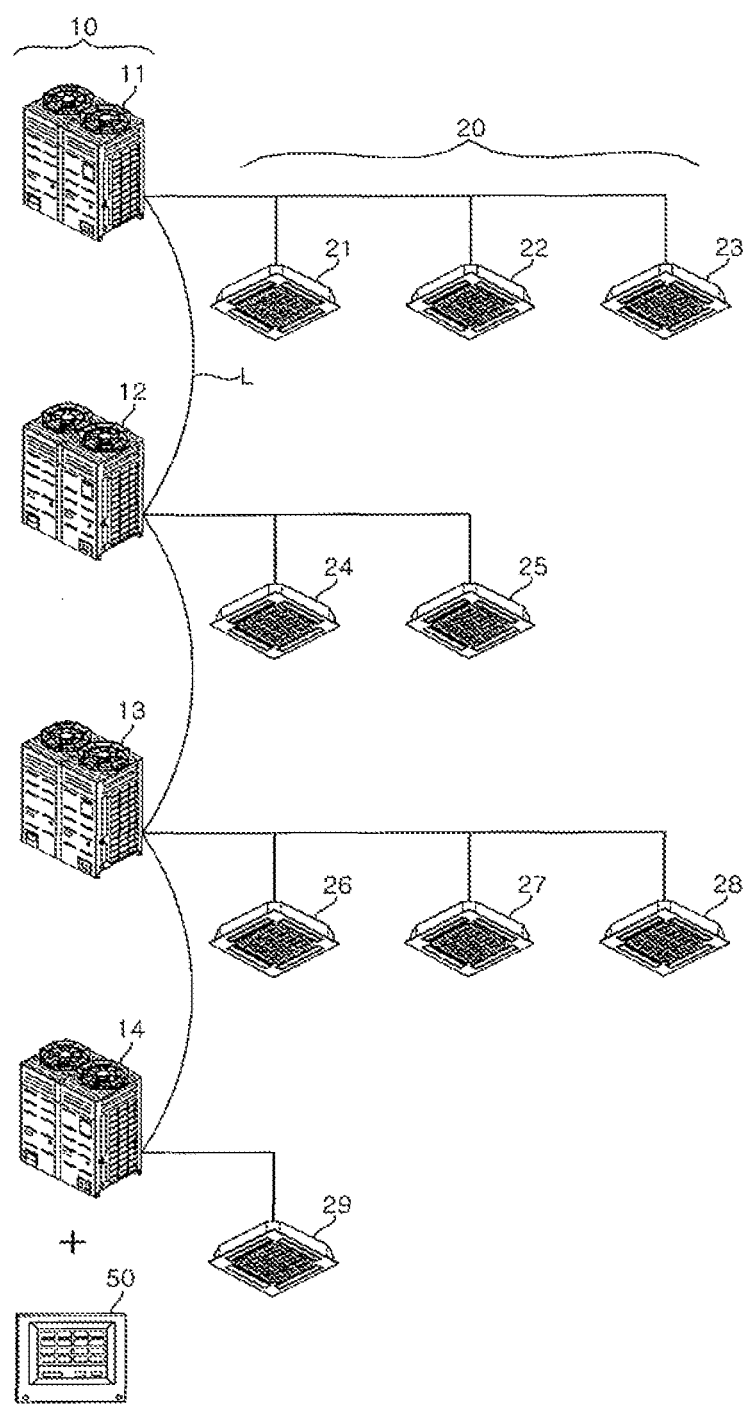
FIG. 2 is a schematic diagram of an air conditioner according to another embodiment.

FIG. 1 is a schematic diagram an air conditioner according to an embodiment. FIG. 2 is a schematic diagram is an air conditioner according to another embodiment.

Referring to FIGS. 1 and 2, an air conditioner according to embodiments may include a plurality of indoor units or devices 20 (21 to 29), and a plurality of outdoor units or devices 10 (11 to 14). In addition, the air conditioner may further include a remote controller 50 connected to the plurality of indoor devices 20 to allow a user to input a control command, to receive data from the plurality of outdoor devices 10 and the plurality of indoor devices 20, and to monitor and control operations of the plurality of outdoor devices 10 and the plurality of indoor devices 20.

The air conditioner may further include a ventilation unit or device, an air purification unit or purifier, a humidification unit or humidifier, a dehumidification unit or dehumidifier, and a heater, descriptions of which have been omitted as they are well known to those skilled in the art of air conditioners, in addition to the plurality of outdoor devices 10 and the plurality of indoor devices 20.

Each of the plurality of indoor devices 20 include an expansion valve (not shown) to expand refrigerant supplied from at least a corresponding one of the plurality of outdoor devices 10 connected to each of the plurality of indoor devices 20, an indoor device heat exchanger (not shown) to perform heat exchange between the refrigerant and air, an indoor device fan (not shown) to introduce indoor air into the indoor device heat exchanger and to discharge the heat-exchanged air into a room, a plurality of sensors (not shown), and a controller (not shown) to control operation of each of the plurality of indoor devices 20. In addition, each of the plurality of indoor devices 20 may further include a discharge port (not shown) to discharge the heat-exchanged air, and an air direction adjustment means or adjustor (not shown) to open and close the discharge port and to adjust a direction of the discharged air. Each of the plurality of indoor devices 20 may control a rotational speed of the indoor device fan to control suctioned air and discharged air, thereby adjusting air volume. In addition, each of the plurality of indoor devices 20 may further include a human sensor to sense a human body present in an indoor space according to circumstances. Further, each of the plurality of indoor devices 20 may further include an output to display an operation state and setting information of each of the plurality of indoor devices 20 and an input to input setting data.

Each of the plurality of outdoor devices 10 may be operated in a cooling mode or in a heating mode to supply refrigerant to at least a corresponding one of the plurality of indoor devices 20 in response to a request of at least a corresponding one of the plurality of indoor devices 20 connected to each of the plurality of outdoor devices 10 or a control command of the remote controller.

Each of the plurality of outdoor devices 10 may include at least one compressor (not shown) to compress refrigerant introduced into the compressor and to discharge a high-pressure gas refrigerant, an accumulator (not shown) to separate the refrigerant into gas refrigerant and liquid refrigerant to prevent the liquid refrigerant, that is, the refrigerant which has not been evaporated, from being introduced into the compressor, an oil separator (not shown) to collect oil from the refrigerant discharged from the compressor, an outdoor device heat exchanger (not shown) to condense or evaporate the refrigerant through heat exchange between the refrigerant and air, an outdoor device fan (not shown) to introduce air into the outdoor device heat exchanger and to discharge the heat-exchanged air out of each of the plurality of outdoor devices 10 such that heat exchange performed by the outdoor device heat exchanger is more smoothly achieved, a four-way valve (not shown) to change a flow channel of the refrigerant according to an operation mode of each of the plurality of outdoor devices 10, at least one pressure sensor (not shown) to measure pressure, at least one temperature sensor (not shown) to measure temperature, and a controller to control operation of each of the plurality of outdoor devices 10 and to communicate with other air conditioner devices. In addition, each of the plurality of outdoor devices 10 may further include a plurality of sensors, a valve, and an overcooling device, detailed descriptions of which have been omitted as they are well known to those skilled in the art of air conditioners.

As shown in FIG. 1, the air conditioner may be configured to have a structure in which the plurality of outdoor devices 10, that is, first to fourth outdoor devices 11 to 14, may be connected to each other to supply refrigerant to the plurality of indoor devices 20, that is, first to ninth indoor devices 21 to 29. In this case, the air conditioner may further include a distributor (not shown) to distribute the refrigerant supplied from the plurality of outdoor devices 10 to corresponding ones of the plurality of indoor devices 20.

In addition, as shown in FIG. 2, each of the plurality of outdoor devices 10 may supply refrigerant to a corresponding one or ones of the plurality of indoor devices 20 connected to each of the plurality of outdoor devices 10, and the plurality of outdoor devices 10 may be connected to each other via a communication line L. More specifically, the first outdoor device 11 may be connected to the first to third indoor devices 21 to 23, the second outdoor device 12 may be connected to the fourth and fifth indoor devices 24 and 25, the third outdoor device 13 may be connected to the sixth to eighth indoor devices 26 to 28, and the fourth outdoor device 14 may be connected to the ninth indoor device 29.

The remote controller 50 may be connected to the plurality of outdoor devices 10 and the plurality of indoor devices 20 connected to each other as described above. The remote controller 50 may be connected to the plurality of outdoor devices 10 and the plurality of indoor devices 20 to monitor an operation state of each of the air conditioner devices based on data received from the plurality of outdoor devices 10 and the plurality of indoor devices 20 and to control the air conditioner devices or a specific one of the air conditioner devices to be operated according to a control command input to the remote controller 50.

A plurality of remote controllers 50 may be provided. The plurality of remote controllers 50 may be connected to each other over a network.

The remote controller 50 may store information received from the air conditioner devices. More specifically, the remote controller 50 may store information regarding the plurality of indoor devices 20 connected to the respective plurality of outdoor devices 10 and information regarding places at which the plurality of outdoor devices 10 and the plurality of indoor devices 20 are installed. In addition, the remote controller 50 may form an air conditioner network to assign addresses to the respective air conditioner devices and to control operations of the respective air conditioner devices based on the assigned addresses.

Figure 3:
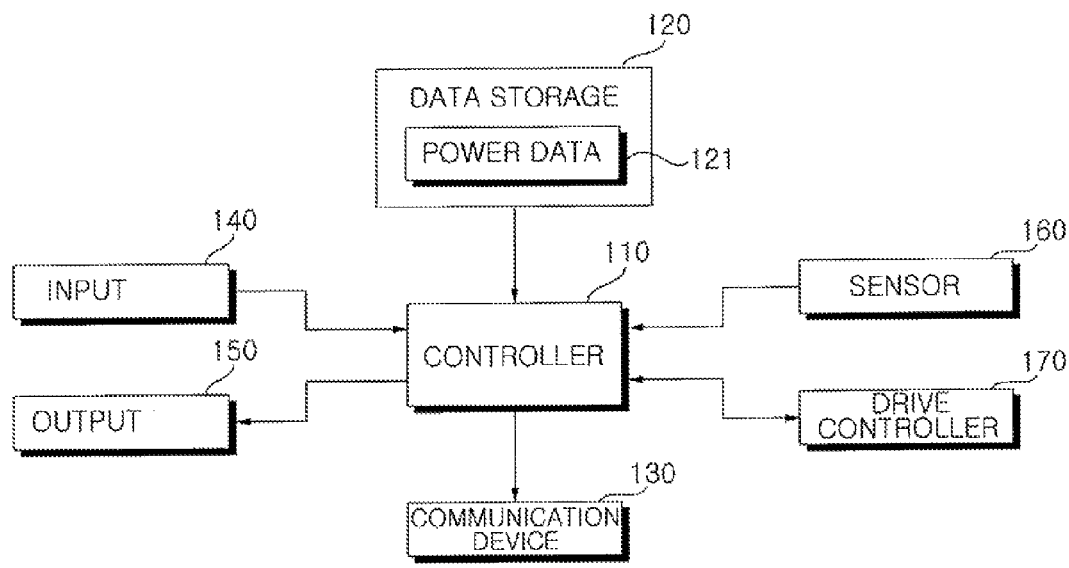
FIG. 3 is a block diagram of an air conditioner device according to an embodiment.

FIG. 3 is a block diagram of an outdoor device as an air conditioner device according to an embodiment. Referring to FIG. 3, the outdoor device 100 may include a drive controller 170, a sensor 160, an input 140, an output 150, a data storage 120, a communication device 130, and a controller 110 to control overall operation of the outdoor device 100. The data storage 120 may store power data 121.

The communication device 130 may include a plurality of communication modules. The communication device 130 may transmit and receive data between the air conditioner devices in a wired or wireless communication fashion. Each outdoor device may be connected to at least one indoor device via a communication line to communicate with the at least one indoor device. Consequently, the outdoor device and the at least one indoor device may form an air conditioner network based on transmission and reception of data through the communication device 130. In this case, the communication device 130 may transmit and receive data between the air conditioner devices through RS485 transmission. In a case in which the remote controller 50 is connected to the outdoor device, the remote controller 50 may perform communication in a communication mode different from the communication mode between the outdoor device and the at least one indoor device.

The drive controller 170 may control operation of the air conditioner device according to a control command of the controller 110. The drive controller 170 may control operations of the compressor, the valve, and the outdoor device fan. In this case, the drive controller 170 may include a compressor drive controller, a valve drive controller, and a fan drive controller.

The sensor 160 may include a plurality of sensors to measure data, such as temperature, pressure, rotational speed, voltage, and current. The sensor 160 may measure information regarding the outdoor device through sensors at an interior and exterior of the outdoor device and input the measured information to the controller 110.

The input 140 may include at least one predetermined input, such as a button or a switch. The input 140 may input a predetermined signal to the controller 110 according to manipulation of the input 140. The input 140 may include an input to perform power, addressing setting, master setting, and text operation.

The output 150 may include a buzzer or a speaker to output a predetermined effect sound or a predetermined warning sound and a lamp lit or blinked to output an operation state of the outdoor device, a connection between the outdoor device and the other air conditioner devices, or warning related to the outdoor device. In addition, the output 150 may include a predetermined display to output numerals, letters, special characters, or images, for example. According to circumstances, the display may not provided.

The data storage 120 may store basic data regarding each air conditioner device, control data necessary to control operation of each air conditioner device, input and output data, and data transmitted and received through the communication device 130. In particular, the data storage 120 may store power data 121. The power data 121 may include not only data regarding power consumption of the outdoor device, but also data of other outdoor device received through the communication device 130.

The controller 110 may process input and output data and control transmission and reception of data between the air conditioner devices through the communication device 130. The controller 110 may store control settings received from the remote controller 50 or a terminal (not shown), or control settings received from at least one of the plurality of indoor devices 20, and control the outdoor device to perform a predetermined operation based on the received control setting or input setting.

The controller 110 may apply a control command to the drive controller 170 such that the outdoor device may perform a predetermined operation based on data input from the sensor 160, check an operation state of the outdoor device, determine whether the operation of the outdoor device is normal or abnormal, and output a warning upon determining that the operation of the outdoor device is abnormal.

The controller 110 may transmit and receive data to and from other air conditioner devices through the communication device 130 based on a predetermined cycle and store data regarding control and operation states of the other air conditioner devices. In addition, the controller 110 may receive power consumption quantity data of other air conditioner devices, that is, other outdoor devices and indoor devices connected to the other outdoor devices, through the communication device 130 and store the received power consumption quantity data in the data storage 120 as the power data 121.

The controller 110 may calculate power consumption quantity of the outdoor device according to a product of input voltage, input current, and power factor based on an operation time of the outdoor device and an operation state of the compressor. In addition, the controller 110 may receive data regarding power consumption quantity from the at least one indoor device connected to the outdoor device. The at least one indoor device may calculate power consumption quantity using input voltage, input current, and power factor, and transmit the result of the calculation to the outdoor device. Alternatively, the at least one indoor device may transmit information regarding input voltage, input current, and power factor to the outdoor device, which may calculate the power consumption quantity.

The controller 110 may store power consumption quantity data of other air conditioner devices, that is, other outdoor devices and indoor devices connected to the other outdoor devices, based on a storage capacity of the data storage 120. In a case in which a quantity of the data stored in the data storage 120 exceeds a predetermined size, the controller 110 may transmit a notification signal to at least one outdoor device, such that the at least one outdoor device may store the power consumption quantity data.

When an outdoor device to store the power consumption quantity data is set after transmission of the notification signal, the controller 110 may transmit data regarding the calculated power consumption quantity to the outdoor device selected to store the power consumption quantity data. In addition, in a case in which the remote controller 50 is connected, the controller 110 may transmit the stored power data 121 to the remote controller 50 according to a request of the remote controller 50. After the remote controller 50 is connected, the controller 110 may transmit data regarding power consumption quantity to the remote controller 50 without storage of data in another outdoor device.

Figure 4:
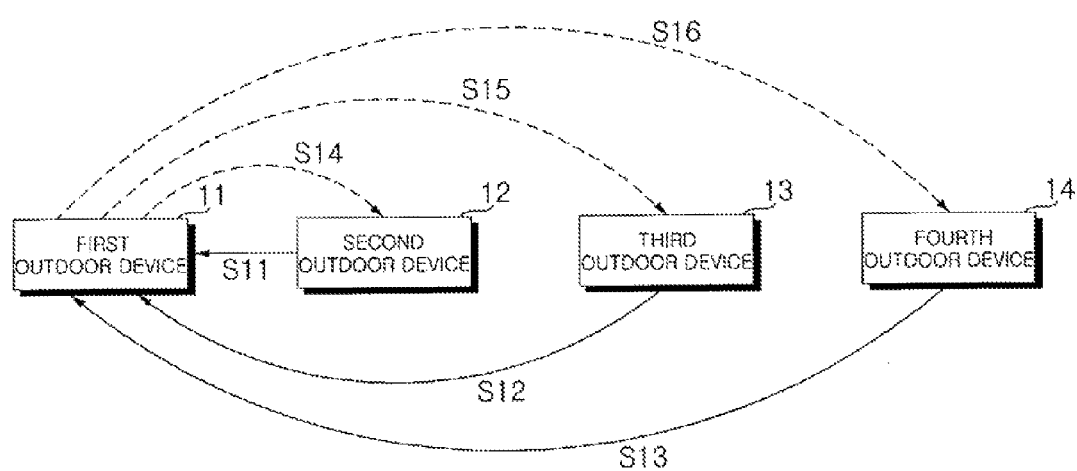
FIG. 4 is a schematic diagram showing flow of data between air conditioner devices based on a first outdoor device of an air conditioner according to an embodiment.

FIG. 4 is a schematic diagram showing flow of data between air conditioner devices based on a first outdoor device of an air conditioner according to an embodiment. As shown in FIG. 4, the plurality of outdoor devices store data through communication between the respective outdoor devices. In the following description, it is assumed that first outdoor device 11 is set as a default device to store power consumption quantity data.

The first to fourth outdoor devices 11 to 14 may be connected to each other via a communication line to transmit and receive data to and from each other. The structure by which the first to fourth outdoor devices 11 to 14 are connected to each other may be based on FIG. 1 or 2. However, embodiments are not limited thereto. The first to fourth outdoor devices 11 to 14 may be connected to each other based on a structure other than the structure shown in FIGS. 1 and 2.

The first outdoor device 11 may periodically request power consumption quantity data from the second to fourth outdoor devices 12 to 14. The first outdoor device 11 may broadcast a request signal to the second to fourth outdoor devices 12 to 14. Alternatively, the first outdoor device 11 may transmit a request signal to the second to fourth outdoor devices 12 to 14 based on addresses of the respective outdoor devices.

The second to fourth outdoor devices 12 to 14 may calculate power consumption quantities according to the request signal of the first outdoor device 11 and transmit the calculated power consumption quantity data to the first outdoor device 11. The second to fourth outdoor devices 12 to 14 may also transmit power consumption quantity information of the indoor devices connected to the second to fourth outdoor devices 12 to 14 to the first outdoor device 11.

The second to fourth outdoor devices 12 to 14 may transmit the power consumption quantity data to the first outdoor device 11 in order of receiving the request signal based on a connection state of the communication line. Alternatively, the second to fourth outdoor devices 12 to 14 may transmit the power consumption quantity data to the first outdoor device 11 in such a manner that one outdoor device waits for a predetermined period of time and then transmits the data to the first outdoor device 11 while another outdoor device transmits the data to the first outdoor device 11.

The first outdoor device 11 may store the received data in data storage 120 as power data 121. The first outdoor device 11 may periodically check a quantity of the stored data. In a case in which the quantity of the data stored in the data storage 120 exceeds a predetermined size, the first outdoor device 11 may transmit a notification signal related to the quantity of the stored data to the second to fourth outdoor devices 12 to 14.

Any one of the outdoor devices may be set as a power consumption quantity data storage based on the notification signal of the first outdoor device 11. The power consumption quantity data storage may be sequentially set in order of connection, or randomly set. However, any air conditioner device, if having already stored data, may be excluded at a next procedure of setting the power consumption quantity data storage.

Figure 5A:
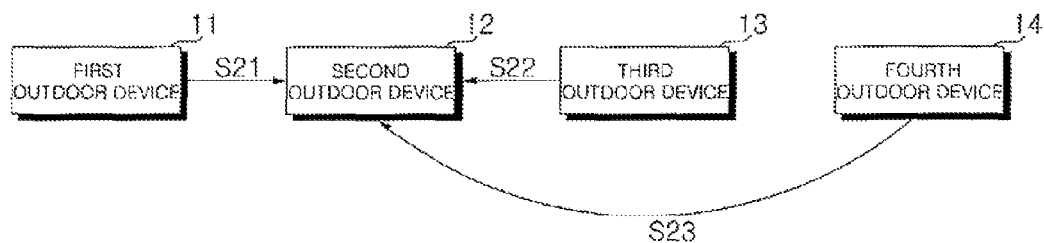
FIGS. 5A-5C are schematic diagrams view showing flow of data between air conditioner devices of an air conditioner according to an embodiment.
Figure 5B:
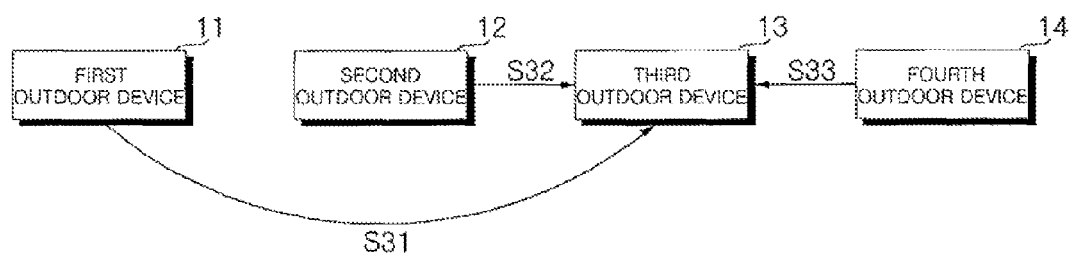
Figure 5C:
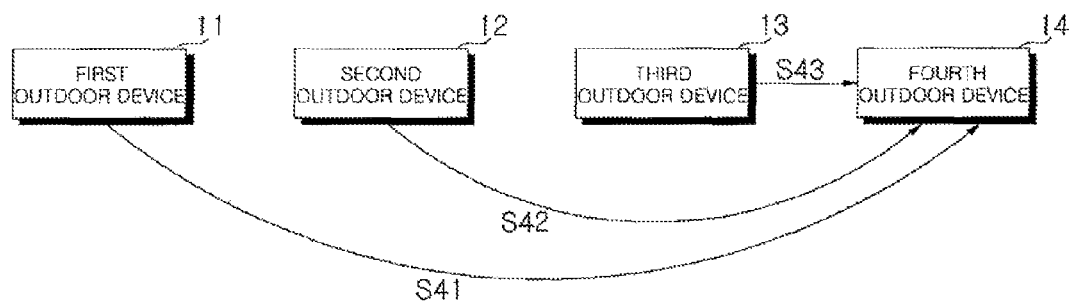

FIGS. 5A-5C are schematic diagrams showing flow of data between air conditioner devices of an air conditioner according an embodiment. In a case in which the power consumption quantity data is stored in the first outdoor device 11 and the quantity of the stored data exceeds a predetermined size as previously described, the second outdoor device 12 may be set as a power consumption quantity data storage, as the first outdoor device 11 cannot store any more data. As a result, as shown in FIG. 5A, the first, third, and fourth outdoor devices 11, 13, and 14 may transmit power consumption quantity data to the second outdoor device 12. The second outdoor device 12 may store the received power consumption quantity data.

In a case in which the second outdoor device 12 stores a predetermined size of data, on the other hand, the power consumption quantity data storage may be reset. As shown in FIG. 5B, the third outdoor device 13 may be set as the power consumption quantity data storage. As a result, the first, second, and fourth outdoor devices 11, 12, and 14 may transmit power consumption quantity data to the third outdoor device 13. The third outdoor device 13 may store the received power consumption quantity data. Of course, the third outdoor device 13 may store power consumption quantity data of the third outdoor device 13, which may be calculated by the third outdoor device 13.

In a case in which the fourth outdoor device 14 is set as the power consumption quantity data storage, as shown in FIG. 5C, the first to third outdoor devices 11 to 13 may transmit power consumption quantity data calculated by the first to third outdoor devices 11 to 13 to the fourth outdoor device 14. The fourth outdoor device 14 may store the received power consumption quantity data.

The power consumption quantity data storage may be sequentially set as described above. According to circumstances, the power consumption quantity data storage may be randomly set. However, any air conditioner device, if having already stored the data, may be excluded at the next procedure of setting the power consumption quantity data storage.

In a case in which all of the first to fourth outdoor devices 11 to 14 cannot store any more data, data may be deleted in order of data storage, and then new data stored. For example, the data stored in the first outdoor device 11 may be the first stored data. Consequently, the data stored in the first outdoor device 11 may be deleted, and then new data may be stored in the first outdoor device 11.

Figure 6:
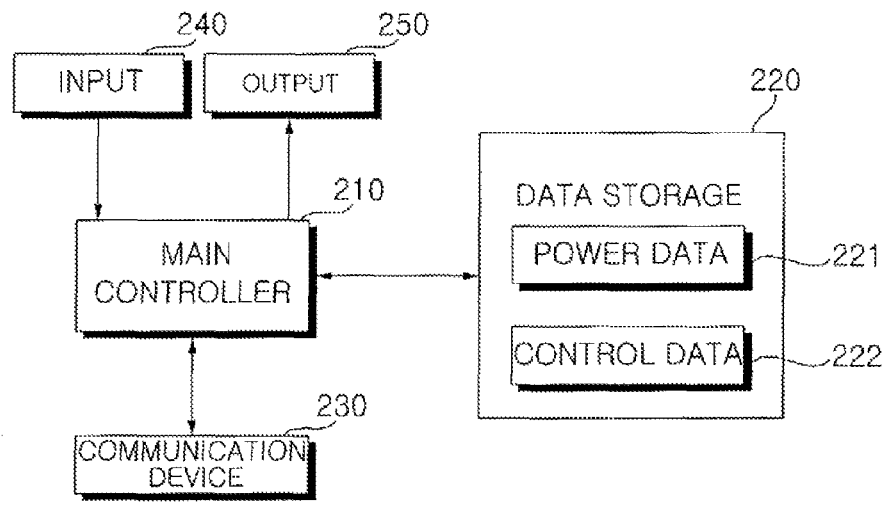
FIG. 6 is a block diagram of a remote controller of an air conditioner according to an embodiment.

FIG. 6 is a block diagram of a remote controller of an air conditioner according to an embodiment. The remote controller 50 may be, for example, connected to the plurality of outdoor devices 10 and the plurality of indoor devices 20 shown in FIG. 1 or 2.

Referring to FIG. 6, the remote controller 50 may include an input 240, an output 250, a communication device 230, a data storage 220, and a main controller 210 to control overall operations of the plurality of outdoor devices and the plurality of indoor devices. The communication device 230 of the remote controller 50 may be connected to the plurality of outdoor devices 10 and the plurality of indoor devices 20 in a wired or wireless communication fashion to transmit and receive data to and from the plurality of outdoor devices 10 and the plurality of indoor devices 20. The communication device 230 may be connected to the plurality of outdoor devices 10 over the Internet or an air conditioner network. The communication device 230 may perform communication in a wireless communication mode as well as a wired communication mode. The communication device 230 may include a plurality of communication modules based on the communication mode.

The input 240 may include at least one predetermined input. The input 240 may input a predetermined signal to the controller 110 according to manipulation of the input 240.

The input 240 may be, for example, a button, a dome switch, a touch pad (static pressure or electrostatic), a jog wheel, a jog switch, a finger mouse, a rotary switch, or a jog dial. The input 240 is not particularly restricted as long as the input 240 creates predetermined input data according to manipulation, such as a push, rotation, pressure, or contact.

The output 250 may display various kinds of information regarding operation states and operation settings of the air conditioner devices received from the plurality of outdoor devices 10 through the communication device 230. In this case, the output 250 may display various kinds of information received through a graphical user interface. The respective air conditioner devices may be displayed as, for example, icons or images.

The output 250 may display a control menu and data in response to a control command of the main controller 210. In addition, the output 250 may display information corresponding to an item selected from the menu. In particular, the output 250 may display power consumption quantity data of the plurality of outdoor devices or the plurality of indoor devices received from the plurality of outdoor devices 10 through the communication device 230 on a screen. In a case in which power consumption quantity exceeds a predetermined level according to settings, the output 250 may output a warning.

The output 250 may be, for example, a display, such as a liquid crystal display (LCD) or a light emitting diode (LED) display. According to circumstances, the output 250 may be, for example, a touch screen. However, embodiments are not limited thereto. The output 250 may include a speaker to output a predetermined sound and a lamp lit or blinked to output operation states of the air conditioner devices, connection states between the air conditioner devices, or a warning as output.

The data storage 220 may store operation of the remote controller 50, data necessary to configure the screen, and control data 222 necessary to control operation of the air conditioner devices. The data storage 220 may store not only operation state data (not shown) of the air conditioner devices received through the communication data 230 but also power data 221 received from the plurality of outdoor devices 10.

In this case, the data storage 220 may include a nonvolatile memory, such as one or more magnetic disc storage devices, one or more flash memory devices, or other nonvolatile solid memory devices. However, embodiments are not limited thereto. The data storage 220 may include readable storage media.

The main controller 210 may process data input and output through the input 240 and the output 250, transmit and receive data to the plurality of outdoor devices 10 and the plurality of indoor devices 20 through the communication device 230, generate a control command to control the air conditioner devices, that is, the plurality of outdoor devices 10 and the plurality of indoor devices 20, to perform predetermined operations according to input settings, and transmit the control command to the plurality of outdoor devices 10 and the plurality of indoor devices 20 through the communication device 230.

The remote controller 50 may include a control program to analyze data received from the plurality of indoor devices 20 and the plurality of outdoor devices 10, and to output a result of analysis to the output 250. The remote controller 50 may output a monitoring screen or a control screen to the output 250 through the control program.

The main controller 210 may output a monitoring screen of the air conditioner devices currently being operated based on the received operation state data of the plurality of outdoor devices 10 and the plurality of indoor devices 20. In addition, the main controller 210 may store the power consumption quantity data received from the plurality of outdoor devices 10 in the data storage 220, analyze the stored power consumption quantity data, and display data based on power consumption on the screen.

In a case in which the main controller 210 is connected to the plurality of outdoor devices 10 through the communication device 230, the main controller 210 may transmit a signal indicating that the main controller 210 is connected to the plurality of outdoor devices 10 to the plurality of outdoor devices 10. In a case in which the main controller 210 is connected to one outdoor device according to a connection state, on the other hand, the main controller 210 may perform transmission to the plurality of outdoor devices 10 through the connected outdoor devices.

The main controller 210 may request the power consumption quantity data stored in the plurality of outdoor device 10 from the plurality of outdoor devices 10, as well as the operation state data of the plurality of outdoor devices 10 and the plurality of indoor devices 20. Upon receiving the power consumption quantity data from the plurality of outdoor devices 10 in response to the request, the main controller 210 may store the power consumption quantity data received through the communication device 230 in the data storage 220 as the power data 221, analyze the stored power consumption quantity data, and display the result of analysis on the screen.

Figure 7:
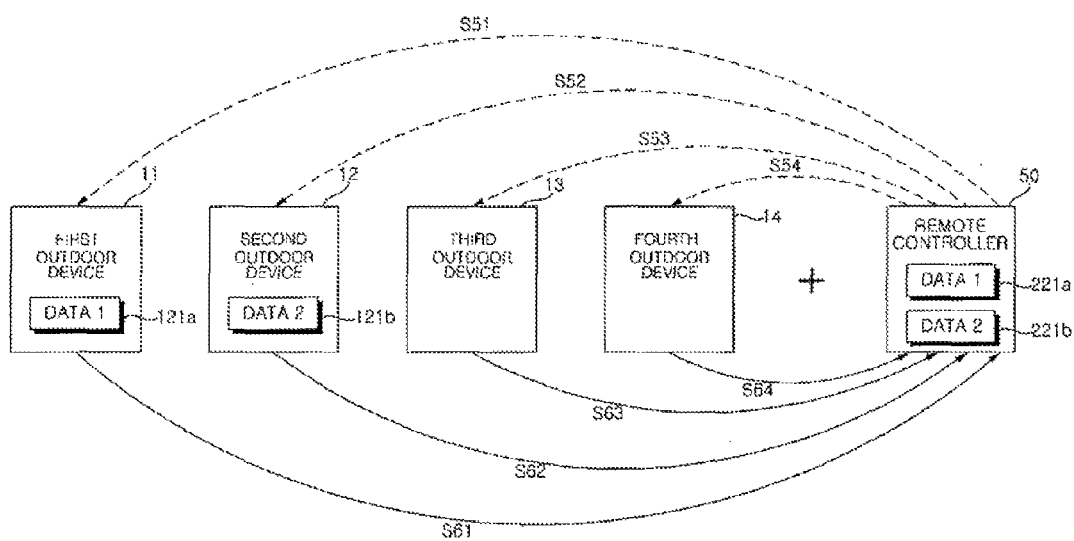
FIG. 7 is a schematic diagram showing flow of data between the air conditioner device and a remote controller of an air conditioner according to an embodiment.

FIG. 7 is a schematic diagram showing flow of data between air conditioner devices and a remote controller of an air conditioner according to an embodiment. In a case in which the plurality of outdoor devices 10 is operated in a state in which the remote controller is not connected to the plurality of outdoor devices 10, as shown in FIG. 7, power consumption quantities of the plurality of outdoor devices 10 may be calculated and the calculated power consumption quantity data of the respective plurality of outdoor devices 10 may be stored in the power consumption quantity data storages.

For example, the power consumption quantity data may be stored in the first outdoor device 11 as data 1 121a, and power consumption quantity data may be stored in the second outdoor device 12 as data 2 121b. The power consumption quantity data may be accumulatively stored. As a size of the power consumption quantity data increases, the power consumption quantity data may be sequentially stored in the third or fourth outdoor device.

In a case which data 1 and data 2 are stored in the first outdoor device 11 and the second outdoor device 12, respectively, the remote controller 50 may be connected to a network formed by the plurality of outdoor devices 10 and the plurality of indoor devices 20.

The main controller 210 of the remote controller 50 may sense that the remote controller 50 is connected to the network according to an input signal of the communication device 230 and request data from the first to fourth outdoor devices 11 to 14 (S51 to S54). The remote controller 50 may broadcast a data request signal to the first to fourth outdoor devices 11 to 14. Alternatively, the remote controller 50 may transmit a data request signal to the first to fourth outdoor devices 11 to 14 based on addresses of the respective outdoor devices.

The first to fourth outdoor devices 11 to 14 may transmit operation state data of the first to fourth outdoor devices 11 to 14 to the remote controller 50. In addition, the first outdoor device 11 and the second outdoor device 12 may transmit the pre-stored power consumption quantity data, that is, data 1 121a and data 2 121b, to the remote controller 50 (S61 and S62).

As the power consumption quantity data is not stored in the other of the first to fourth outdoor devices 11 to 14, that is, the third and fourth outdoor device 13 and 14, the third and fourth outdoor device 13 and 14 may not transmit data to the remote controller 50, and according to circumstances, the third and fourth outdoor device 13 and 14 may transmit a response signal indicating that there is no data stored in the third and fourth outdoor device 13 and 14 to the remote controller 50 (S63 and S64).

Data 1 121a and data 2 121b transmitted as described above may be stored in the remote controller 50 as power data, that is, data 1 221a and data 2 221b. The remote controller 50 may analyze the received data 1 and data 2 to determine power consumption quantity of the air conditioner according to an operation of the air conditioner before the remote controller 50 is connected to the plurality of outdoor devices 10 and the plurality of indoor devices 20 and display data regarding the determined power consumption quantity of the air conditioner. In addition, the remote controller 50 may transmit power data of the air conditioner to an external apparatus according to a request of the external apparatus. At this time, in a case in which a controller is connected to the plurality of outdoor devices and the plurality of indoor devices in addition to the remote controller, the plurality of outdoor devices may transmit the power consumption quantity data stored in the plurality of outdoor device to the controller connected to the outdoor devices. The controller may be one selected from among a remote controller for central control, a general remote controller, a power indicator, a power controller, and a demand controller.

Figure 8:
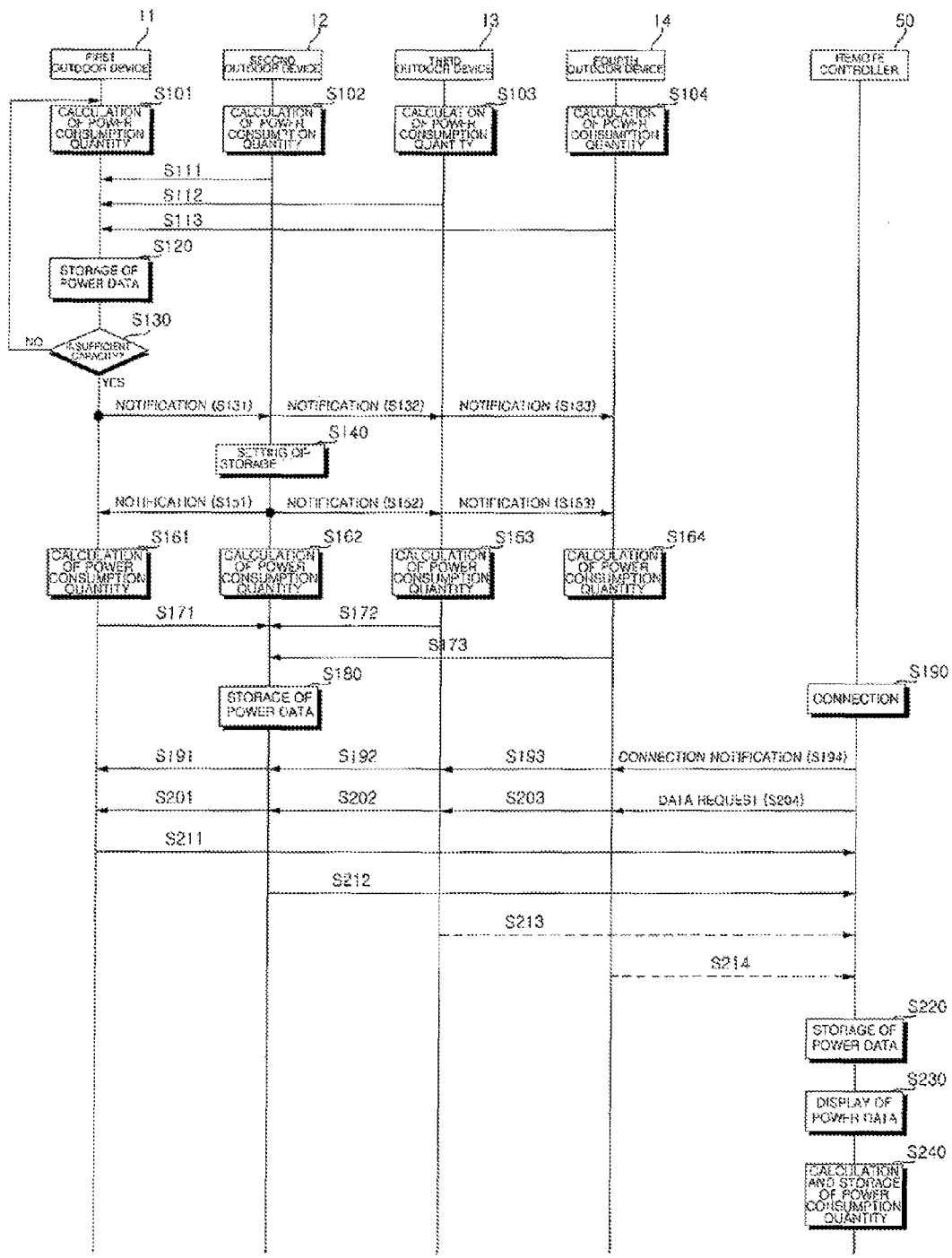
FIG. 8 is a flowchart of method for operating an air conditioner according to an embodiments, based on data communication.

FIG. 8 is a flowchart of a method for operating an air conditioner according to an embodiment, based on data communication. Referring to FIG. 8, in a state in which first outdoor device 11 is set as the power consumption quantity data storage, first to fourth outdoor devices 11 to 14 may calculate power consumption quantities of the first to fourth outdoor devices 11 to 14, in steps S101 to S104. At this time, the power consumption quantities may be calculated as a product of input voltage, input current, and power factor, for example. The plurality of indoor devices 20 may calculate power consumption quantities of the plurality of indoor devices 20, and transmit the calculated power consumption quantities to the plurality of outdoor devices 10. Alternatively, the plurality of indoor devices 20 may transmit information regarding the plurality of indoor devices 20 to the plurality of outdoor devices 10, and then the plurality of outdoor devices 10 may calculate power consumption quantities of the plurality of indoor devices 20.

The second to fourth outdoor devices 12 to 14 may transmit the calculated power consumption quantities of the second to fourth outdoor devices 12 to 14 to the first outdoor device 11 as the power consumption quantity data storage, in step S111 to S113. At this time, the second to fourth outdoor devices 12 to 14 may sequentially transmit the calculated power consumption quantities of the second to fourth outdoor devices 12 to 14 to the first outdoor device 11 according to a communication state. Alternatively, the second to fourth outdoor devices 12 to 14 may randomly transmit the calculated power consumption quantities of the second to fourth outdoor devices 12 to 14 to the first outdoor device 11 based on a predetermined standby time.

The first outdoor device 11 may store calculated power consumption quantities of the first outdoor device 11 and the received power consumption quantities of the second to fourth outdoor devices 12 to 14 in the data storage 120, in step S120. The first outdoor device 11 may periodically receive the power consumption quantities of the second to fourth outdoor devices 12 to 14, repeatedly store the received power consumption quantities of the second to fourth outdoor devices 12 to 14, and check a size of the accumulatively stored data. In a case in which the size of the stored data exceeds a predetermined size, that is, data storage capacity of the first outdoor device 11 may be insufficient, in step S130, the first outdoor device 11 may transmit a notification signal indicating that the size of the stored data has exceeded the predetermined size to the second, third, and fourth outdoor devices 12, 13, and 14, in steps S131, S132, and S133.

As the first outdoor device 11 cannot store any more data, the second outdoor device 12 may be set as the power consumption quantity data storage, in step S140. The second outdoor device 12 may generate a notification signal indicating that the second outdoor device 12 has been set as the power consumption quantity data storage and transmit the generated notification signal to the first, third, and fourth outdoor devices 11, 13, and 14, in steps S151 to S153.

The first to fourth outdoor devices 11 to 14 may calculate power consumption quantities of the first to fourth outdoor devices 11 to 14, in steps S161 to S164. The first, third, and fourth outdoor devices 11, 13, and 14 may transmit the calculated power consumption quantities of the first, third, and fourth outdoor devices 11, 13, and 14 to the second outdoor device 12, in steps S171 to S173.

The second outdoor device 12 may store the calculated power consumption quantity of the second outdoor device 12 and the received power consumption quantities of the first, third, and fourth outdoor devices 11, 13, and 14 in the data storage as power data, in step S180. In a case in which each of the first to fourth outdoor devices 11 to 14 is sequentially set as the power consumption quantity data storage, the power data may be stored in the first to fourth outdoor devices 11 to 14, and all of the first to fourth outdoor devices 11 to 14 cannot store any more data, the data may be deleted in order of data storage, and then new data may be stored.

In a case in which the remote controller 50 is connected to the first to fourth outdoor devices 11 to 14, in step S190, on the other hand, the remote controller 50 may transmit a connection notification signal indicating that the remote controller 50 has been connected to the first to fourth outdoor devices 11 to 14 to the first to fourth outdoor devices 11 to 14, in steps S191 to S194. At this time, the remote controller 50 may set addresses for central control to the respective air conditioner devices.

The remote controller 50 may request data from the first to fourth outdoor devices 11 to 14, in steps S201 to S204. The first to fourth outdoor devices 11 to 14 may transmit not only operation state data of the first to fourth outdoor devices 11 to 14, but also the power data stored in the first to fourth outdoor devices 11 to 14 to the remote controller 50 according to the request of the remote controller 50.

At this time, the first and second outdoor devices 11 and 12 may transmit the power data to the remote controller 50 as the first and second outdoor devices 11 and 12 store the power data, in steps S211 and S212. As the third and fourth outdoor devices 13 and 14 store no power data, the third and fourth outdoor devices 13 and 14 may not transmit a response signal to the remote controller 50, or may transmit a notification signal indicating that the third and fourth outdoor devices 13 and 14 store no power data to the remote controller 50, in steps S213 and S214.

The remote controller 50 may store the received power data, in step S220, analyze the stored power data, and output the analysis result of the power data through the output 250, in step S230.

After the remote controller 50 is connected to the first to fourth outdoor devices 11 to 14, the first to fourth outdoor devices 11 to 14 may calculate power consumption quantities of the first to fourth outdoor devices 11 to 14 and transmit the calculated power consumption quantities of the first to fourth outdoor devices 11 to 14 to the remote controller 50. The remote controller 50 may calculate the power consumption quantities of the first to fourth outdoor devices 11 to 14 based on information received by the remote controller 50, in step S240. Upon receiving the power data of the first to fourth outdoor devices 11 to 14, the remote controller 50 may store the received power data of the first to fourth outdoor devices 11 to 14.

Figure 9:
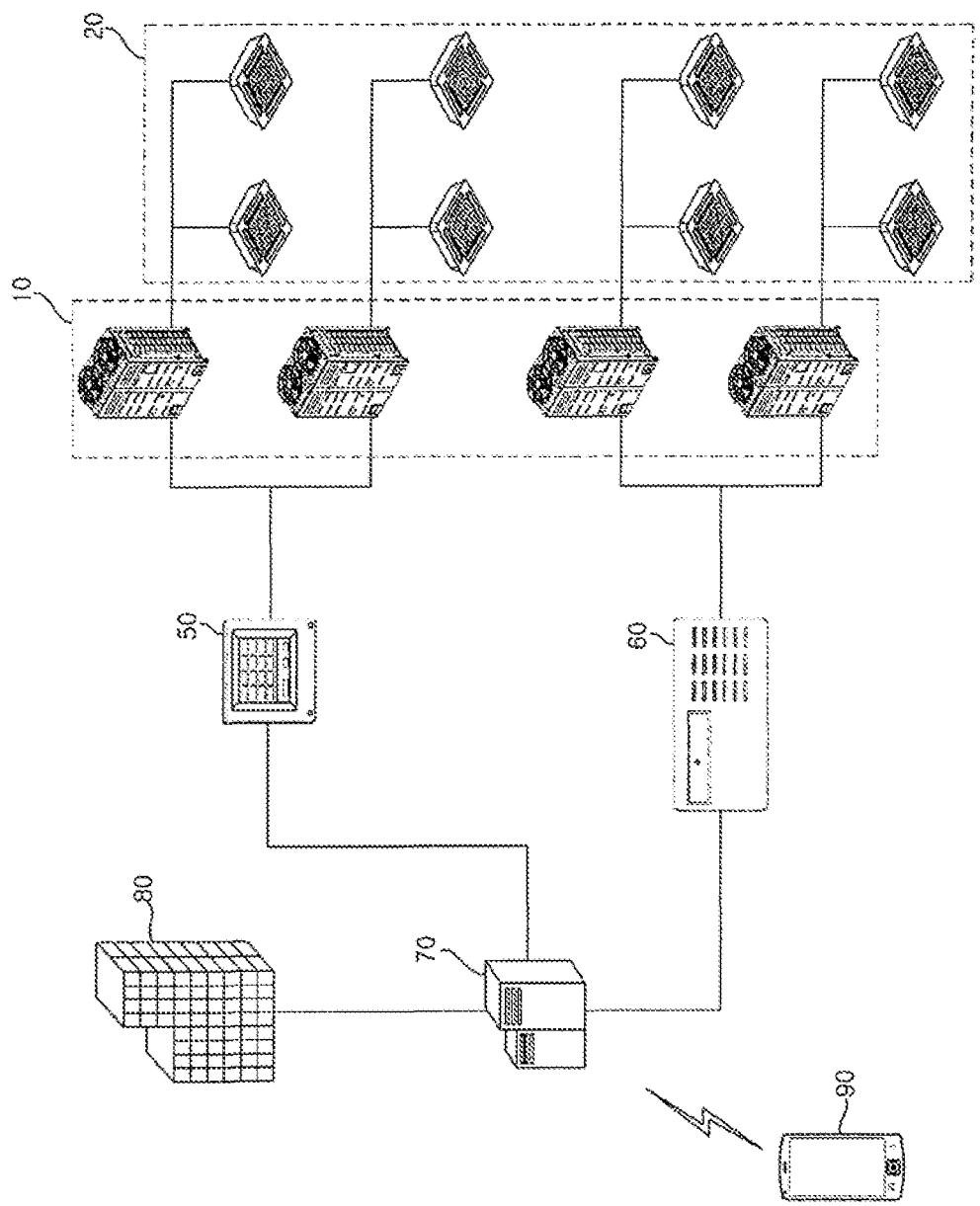
FIG. 9 is a schematic diagram of an air conditioner according to another embodiment.

FIG. 9 is a schematic diagram of an air conditioner system according to another embodiment. Referring to FIG. 9, the plurality of outdoor devices 10 and the plurality of indoor devices 20 may be connected to a power indicator 60 or a data server 70 in addition to the remote controller 50. The data server 70 may be cooperatively connected to a server 80 of an electric power company to apply power rates based on power consumption quantity information. A terminal 90 may access the data server 70 to receive information regarding power consumption of the air conditioner.

The data server 70 may be connected to a plurality of indoor and outdoor device groups, as well as one indoor and outdoor device group. In addition, the data server 70 may store data regarding the indoor and outdoor device groups.

The data server 70 may calculate statistical data per day, week, month, and year based on power data regarding the air conditioner, which may be accumulatively stored to generate a report of the power consumption quantities. In addition, the data server 70 may generate estimated data regarding future power consumption based on the accumulatively stored power data.

The report of the power consumption quantities or the estimated data regarding future power consumption may be used when each air conditioner sets a target value based on power consumption. For example, in a case in which the air conditioner performs power peak control or demand control, the air conditioner may set a target value or a reference value based on data of the data server 70.

Figure 10:
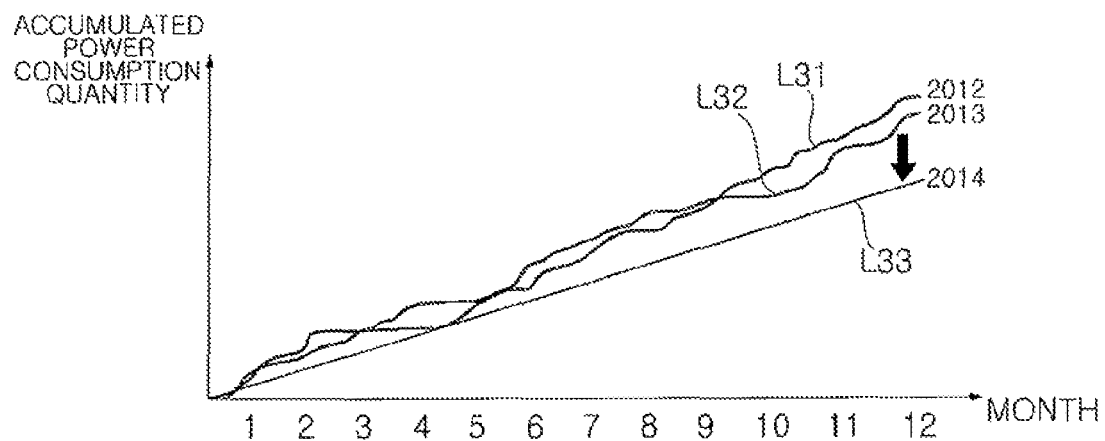
FIG. 10 is a graph showing statistical data of an air conditioner device according to embodiments.

FIG. 10 is a graph showing statistical data of an air conditioner device according to an embodiment. As shown in FIG. 10, the remote controller 50 may analyze power data received from an outdoor device 10 and display information regarding accumulated power consumption quantity per period.

In addition to the remote controller 50, the data server 70 may calculate estimated power consumption quantity for the future, that is, the year of 2014, for example, based on the information regarding the accumulated power consumption quantity per period. The power consumption quantity accumulated per year and month may be displayed, for example, as a graph, and estimated data may be generated based on a change in energy consumption. For example, in a case in which the accumulated power consumption quantities in the years of 2012 and 2013 are compared to set a target based on power consumption, a criterion, based on which 20% reduction in power consumption quantity is achieved in the year of 2014, may be set as show in FIG. 10. In addition, the electric power company may increase or decrease electric power production in consideration of change in power consumption quantity per season and set power rates accordingly.

According to embodiments, therefore, power data may be accumulatively stored in the outdoor devices through data communication between the air conditioner devices, and the stored power data may be kept for a predetermined period of time or even longer in a case in which an additional power data storage apparatus is not provided. The accumulatively stored power data may be transmitted to a device, such as a remote controller, a power indicator, or a control terminal, which may be connected to the plurality of outdoor devices, such that the device may use data regarding power consumption of the air conditioner. Consequently, it is possible to check a target value based on power consumption of the air conditioner, or a power consumption pattern of the air conditioner and to study energy consumption measures based thereon.

Although all components constituting embodiments have been described as being combined into one component or being combined into one component and being operated as one component, embodiments are not limited thereto. According to embodiments, all components constituting each of the embodiments may be selectively coupled into one or more components and be operated as one or more components. Also, although each of the components may be realized as independent hardware, some or all of the components may be selectively combined as a computer program having a program module executing some or all functions combined from one or several pieces of hardware.

As is apparent from the above description, in an air conditioner according to embodiments and a method for operating an air conditioner according to embodiments, a plurality of air conditioner devices may store data of the air conditioner devices through transmission and reception of data between the air conditioner devices and at least one of the air conditioner devices may transmit the stored data to the other air conditioner devices according to requests of the other air conditioner devices to calculate statistical data based on operation of the air conditioner in a state in which a controller, such as a remote controller, is not connected to the air conditioner devices, thereby easily utilizing past data of the air conditioner.

Embodiments disclosed herein provide an air conditioner configured to have a structure in which data may be transmitted and received between a plurality of air conditioner devices, such that the air conditioner devices may store data, and the stored data may be transmitted to utilize statistical data based on a previous operation of the air conditioner and a method for operating an air conditioner.

In accordance with one embodiment disclosed herein an air conditioner is provided that may include a plurality of outdoor units or devices and a plurality of indoor units or devices connected to the respective outdoor units, wherein the outdoor units may set any one of the outdoor units as a storage unit or storage, calculate power consumption quantities of the outdoor units at predetermined time intervals, and transmit the calculate power consumption quantities of the outdoor units to the storage unit, and the storage unit may accumulatively store the power consumption quantity data received from the outdoor units. The air conditioner may further include a controller further connected to the outdoor units, wherein, in a case in which the controller is further connected to the outdoor units, the storage unit may transmit the power consumption quantity data of the outdoor units stored in the storage unit to the controller.

In accordance with another embodiment disclosed herein, a method for operating an air conditioner is provided that may include setting a first outdoor unit or device selected from among a plurality of outdoor units or devices as a storage unit or storage, calculating power consumption quantities of the respective outdoor units, transmitting the calculated power consumption quantity data of the respective outdoor units to the first outdoor device set as the storage, and accumulatively storing the received power consumption quantity data of the respective outdoor devices in the first outdoor device.

Although embodiments have been disclosed for illustrative purposes, those skilled in the art will appreciate that various modifications, additions and substitutions are possible, without departing from the scope and spirit as disclosed in the accompanying claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner, comprising:
a plurality of outdoor devices including a first outdoor device and a second outdoor device; and
a plurality of indoor devices connected to the plurality of outdoor devices, including a first indoor device connected to the first outdoor device, and a second indoor device connected to the second device, wherein the plurality of outdoor devices sets the first outdoor device as a storage device, wherein the second outdoor device calculates power consumption quantities of the second outdoor device and the second indoor device, respectively, and transmits the calculated power consumption quantities to the first outdoor device set as the storage device, wherein the first outdoor device accumulatively stores the power consumption quantity data received from the plurality of outdoor devices including the second outdoor device in a data storage, and wherein, when a size of the power consumption quantity data accumulatively stored in the first outdoor device exceeds a predetermined size, the first outdoor device sets a new storage device from among the plurality of outdoor devices excluding the first outdoor device previously set as the storage device.

2. The air conditioner according to claim 1, wherein the first outdoor device sets the second outdoor device as the new storage device, and wherein the first outdoor device calculates power consumption quantities of the first outdoor device and the first indoor device, respectively, and transmits the calculated power consumption quantities to the second outdoor device set as the new storage device.

3. The air conditioner according to claim 2, wherein the first outdoor device keeps the previously stored power consumption quantities data, when the second outdoor device is set as the new storage device.

4. The air conditioner according to claim 1, wherein, when all of the plurality of outdoor devices cannot store any more power consumption quantity data, the first outdoor device deletes data in order of data storage, and stores new power consumption quantity data.

5. The air conditioner according to claim 1, wherein the first outdoor device generates a notification signal indicating that a storage capacity of the first outdoor device is insufficient and transmits the notification signal to the plurality of outdoor devices.

6. The air conditioner according to claim 2, wherein the second outdoor device transmits a notification signal indicating that the second outdoor device has been selected as the new storage device to the plurality of outdoor devices.

7. The air conditioner according to claim 1, further comprising:
a controller configured to be connected to the plurality of outdoor devices, wherein, the first outdoor device transmits the power consumption quantity data of the plurality of outdoor devices to the controller when the controller is connected to the plurality of outdoor devices.

8. The air conditioner according to claim 7, wherein the plurality of outdoor devices periodically transmits newly calculated power consumption quantity data of the plurality of outdoor devices to the controller, when the controller is connected to the plurality of outdoor devices.

9. The air conditioner according to claim 7, wherein the contoller stores the power consumption quantity data received from the plurality of outdoor devices, analyzes the power consumption quantity data to calculate statistical data regarding power consumption of the plurality of outdoor devices and the plurality of indoor devices, and displays the calculated statistical data.

10. A method for operating an air conditioner, the method comprising:
setting a first outdoor device selected from among a plurality of outdoor devices including the first outdoor device and a second outdoor device, as a storage device;
calculating, via the second outdoor device, power consumption quantities of the second outdoor device and a second indoor device connected the second outdoor device;
transmitting via the second outdoor device, the calculated power consumption quantity data of the second outdoor device to the first outdoor device set as the storage device; and
receiving, via the first outdoor device, the calculated power consumption quantity data of the plurality of outdoor devices including the second outdoor device;
accumulatively storing the received power consumption quantity data of the plurality of outdoor devices in the first outdoor device set as the storage device;
setting via the first outdoor device, a new storage device from among the plurality of outdoor devices excluding the first outdoor device previously set as the storage device, in a case in which a size of the power consumption quantity data stored in the first outdoor device reaches a storage capacity of the first outdoor device.

11. The method according to claim 10, further including:
setting the second outdoor device as the new storage device;
calculating, via the first outdoor device, power consumption quantities of the first outdoor device and a first indoor device connected the first outdoor device;
transmitting via the first outdoor device, the calculated power consumption quantity data of the first outdoor device to the second outdoor device set as the new storage device.

12. The method according to claim 10, further including:
keeping via the first outdoor device, the previously stored power consumption quantity data of the plurality of outdoor devices when the second outdoor device is set as the new storage device.

13. The method according to claim 10, further including:
deleting from the first outdoor device the power consumption quantity data in order of power consumption quantity data storage and storing new power consumption quantity data in a case in which all of the plurality of outdoor devices cannot store any more power consumption quantity data.

14. The method according to claim 10, further including:
connecting a controller to the plurality of outdoor devices; and
transmitting the power consumption quantity data stored in the first outdoor device to the controller.

15. The method according to claim 14, further including:
analyzing, in the controller, the received power consumption quantity data to calculate statistical data regarding power consumption of the plurality of outdoor devices and a plurality of indoor devices connected thereto, and outputting the calculated statistical data.

* * * * *